US009807688B2

United States Patent
Yi et al.

(10) Patent No.: US 9,807,688 B2
(45) Date of Patent: *Oct. 31, 2017

(54) METHOD FOR PERFORMING RANDOM ACCESS PROCEDURES AND TERMINAL THEREOF

(71) Applicant: OPTIS CELLULAR TECHNOLOGY, LLC, Plano, TX (US)

(72) Inventors: Seung-June Yi, Anyang-si (KR);
Sung-Jun Park, Anyang-si (KR);
Young-Dae Lee, Anyang-si (KR);
Sung-Duck Chun, Anyang-si (KR)

(73) Assignee: Optis Cellular Technology, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,861

(22) Filed: Aug. 9, 2016

(65) Prior Publication Data
US 2016/0353376 A1 Dec. 1, 2016

Related U.S. Application Data

(63) Continuation of application No. 14/591,399, filed on Jan. 7, 2015, now Pat. No. 9,432,937, which is a
(Continued)

(30) Foreign Application Priority Data

Jun. 2, 2009 (KR) .................. 10-2009-0048775

(51) Int. Cl.
*H04W 74/08* (2009.01)
*H04W 52/02* (2009.01)
(Continued)

(52) U.S. Cl.
CPC ....... *H04W 52/0216* (2013.01); *H04W 24/08* (2013.01); *H04W 72/042* (2013.01);
(Continued)

(58) Field of Classification Search
CPC .......... H04W 72/042; H04W 52/0216; H04W 74/0833; H04W 74/006; H04W 24/08;
(Continued)

(56) References Cited

U.S. PATENT DOCUMENTS 7,848,346 B2 12/2010 Park et al.
7,933,243 B2 4/2011 Yi et al.
(Continued)

FOREIGN PATENT DOCUMENTS

CN 1192561 9/2001
CN 101188852 5/2008
(Continued)

OTHER PUBLICATIONS

European Office Action dated Oct. 5, 2016 in EP 09007290.3, 5 pages.
(Continued)

*Primary Examiner* — Mohamed Kamara
(74) *Attorney, Agent, or Firm* — Nixon & Vanderhye P.C.

(57) ABSTRACT

A random access procedure between a mobile terminal and a network is performed based upon the characteristics of a RACH preamble. If the RACH preamble was explicitly signaled by the network, a downlink channel is monitored until a new transmission is indicated according to radio resource allocation information received from the network. If the RACH preamble was not explicitly signaled by the network, a contention resolution timer is started and the downlink channel is monitored until the contention resolu-
(Continued)

tion timer expires. Such monitoring of downlink channels in a more efficient manner, results in effective reduction in power consumption.

11 Claims, 9 Drawing Sheets

Related U.S. Application Data continuation of application No. 13/894,948, filed on May 15, 2013, now Pat. No. 8,934,391, which is a continuation of application No. 13/071,280, filed on Mar. 24, 2011, now Pat. No. 8,467,343, which is a continuation of application No. 12/457,653, filed on Jun. 17, 2009, now Pat. No. 7,933,243.

(60) Provisional application No. 61/073,743, filed on Jun. 18, 2008, provisional application No. 61/074,998, filed on Jun. 23, 2008.

(51) Int. Cl.
*H04W 72/04* (2009.01)
*H04W 74/00* (2009.01)
*H04W 24/08* (2009.01)
*H04W 24/00* (2009.01)

(52) U.S. Cl.
CPC ..... *H04W 74/002* (2013.01); *H04W 74/0833* (2013.01); *H04W 24/00* (2013.01); *H04W 74/006* (2013.01); *H04W 74/008* (2013.01); *H04W 74/0808* (2013.01); *Y02B 60/50* (2013.01)

(58) Field of Classification Search
CPC . H04W 74/002; H04W 24/00; H04W 74/008; H04W 74/0808; H04W 56/00; H04W 72/0413; H04W 56/0005; H04W 4/20; H04W 74/004
See application file for complete search history.

(56) References Cited

U.S. PATENT DOCUMENTS

| | | | |
|---|---|---|---|
| 8,467,343 B2 | 6/2013 | Yi et al. | |
| 8,934,391 B2 | 1/2015 | Yi et al. | |
| 2001/0043582 A1 | 11/2001 | Nakada | |
| 2002/0009067 A1 | 1/2002 | Sachs et al. | |
| 2003/0095534 A1 | 5/2003 | Jiang | |
| 2004/0147276 A1 | 7/2004 | Gholmieh et al. | |
| 2004/0185892 A1 | 9/2004 | Iacono et al. | |
| 2005/0078641 A1 | 4/2005 | Kim | |
| 2005/0141436 A1 | 6/2005 | Dick et al. | |
| 2005/0249123 A1 | 11/2005 | Finn | |
| 2006/0013182 A1 | 1/2006 | Balasubramanian et al. | |
| 2006/0013268 A1 | 1/2006 | Terry | |
| 2006/0280145 A1 | 12/2006 | Revel et al. | |
| 2007/0206531 A1 | 9/2007 | Pajukoski et al. | |
| 2008/0008212 A1 | 1/2008 | Wang et al. | |
| 2008/0095185 A1* | 4/2008 | DiGirolamo | H04L 1/0026 370/464 |
| 2008/0096563 A1 | 4/2008 | Fischer et al. | |
| 2008/0098234 A1 | 4/2008 | Driscoll et al. | |
| 2008/0186892 A1 | 8/2008 | Damnjanovic | |
| 2008/0188247 A1 | 8/2008 | Worrall | |
| 2008/0192766 A1 | 8/2008 | Ranta-Aho et al. | |
| 2008/0207150 A1 | 8/2008 | Malladi | |
| 2008/0232317 A1 | 9/2008 | Jen | |
| 2008/0232329 A1 | 9/2008 | Jen | |
| 2008/0310396 A1 | 12/2008 | Park | |
| 2008/0313300 A1 | 12/2008 | Alanara et al. | |
| 2008/0316961 A1 | 12/2008 | Bertrand et al. | |
| 2009/0088195 A1 | 4/2009 | Rosa et al. | |
| 2009/0156194 A1 | 6/2009 | Meylan | |
| 2009/0175187 A1 | 7/2009 | Jerseni et al. | |
| 2009/0186624 A1 | 7/2009 | Cave et al. | |
| 2009/0190538 A1 | 7/2009 | Hasegawa | |
| 2009/0213968 A1 | 8/2009 | Tormalehto | |
| 2009/0219873 A1* | 9/2009 | Higuchi | H04J 13/00 370/329 |
| 2009/0225711 A1 | 9/2009 | Sammour et al. | |
| 2009/0232076 A1 | 9/2009 | Kuo | |
| 2009/0303954 A1 | 12/2009 | Guo | |
| 2009/0305665 A1 | 12/2009 | Kennedy et al. | |
| 2010/0027511 A1 | 2/2010 | Terry | |
| 2010/0034162 A1 | 2/2010 | Ou et al. | |
| 2010/0080181 A1 | 4/2010 | Yamada et al. | |
| 2010/0093386 A1 | 4/2010 | Damnjanovic et al. | |
| 2010/0103889 A1* | 4/2010 | Kim | H04W 74/004 370/329 |
| 2010/0202288 A1 | 8/2010 | Park et al. | |
| 2010/0226325 A1 | 9/2010 | Chun et al. | |
| 2010/0281486 A1 | 11/2010 | Lu et al. | |
| 2010/0329193 A1* | 12/2010 | Bienas | H04W 74/006 370/329 |
| 2011/0216705 A1 | 9/2011 | Lee et al. | |
| 2011/0216706 A1 | 9/2011 | Lee et al. | |

FOREIGN PATENT DOCUMENTS

| | | |
|---|---|---|
| EP | 1755355 | 2/2007 |
| EP | 1973281 | 9/2008 |
| EP | 2094053 | 8/2009 |
| EP | 2136599 | 12/2009 |
| JP | 2007-266733 | 10/2007 |
| JP | 2009-303213 | 12/2009 |
| JP | 2010-541520 | 3/2011 |
| JP | 2011-509049 | 3/2011 |
| KR | 0567211 | 4/2006 |
| KR | 2006-0115175 | 11/2006 |
| KR | 2006-0120115 | 11/2006 |
| KR | 2007-0107619 | 11/2007 |
| KR | 2007-0108300 | 11/2007 |
| KR | 2007-0109313 | 11/2007 |
| KR | 2008-0016367 | 2/2008 |
| KR | 2008-0026583 | 3/2008 |
| KR | 2008-0039177 | 5/2008 |
| KR | 2008-0039294 | 5/2008 |
| KR | 2008-0049596 | 6/2008 |
| KR | 2008-0065880 | 7/2008 |
| KR | 2008-0112649 | 12/2008 |
| KR | 2009-0014937 | 2/2009 |
| KR | 2009-0016402 | 2/2009 |
| KR | 2009-0084690 | 8/2009 |
| RU | 2233546 | 7/2004 |
| RU | 2332802 | 8/2008 |
| WO | WO 2004/056009 | 7/2004 |
| WO | WO 2007/082407 | 7/2007 |
| WO | WO 2007/083230 | 7/2007 |
| WO | WO 2007/091831 | 8/2007 |
| WO | WO 2007/128204 | 11/2007 |
| WO | WO 2007-143916 | 12/2007 |
| WO | WO 2008/024628 | 2/2008 |
| WO | WO 2008/042967 | 4/2008 |
| WO | WO 2008/054112 | 5/2008 |
| WO | WO 2008/097023 | 8/2008 |
| WO | WO 2008/097030 | 8/2008 |
| WO | WO 2008/131401 | 10/2008 |
| WO | WO 2008/155469 | 12/2008 |
| WO | WO 2009/005429 | 1/2009 |
| WO | WO 2009-023470 | 2/2009 |
| WO | WO 2009/086188 | 7/2009 |
| WO | WO 2009/088858 | 7/2009 |
| WO | WO 2009/096195 | 8/2009 |

OTHER PUBLICATIONS

U.S. Appl. No. 14/591,399, filed Jan. 7, 2015, Inventor: Yi et al.
Office action dated Oct. 2, 2015 in co-pending U.S. Appl. No. 14/591,399 17 pages.

(56) References Cited

OTHER PUBLICATIONS

Chinese Office Action dated Oct. 21, 2014 in CN200980123161.7 and English translation, 10 pages.
European Office Action dated Jul. 29, 2014 in EP 09007920.3, 6 pages.
English translation of Chinese Office Action dated Apr. 8, 2014 in Chinese Application No. 20098012316.7, 5 pages.
LG Electronics Inc., Correction to RACH Procedure, 3GPP TSG-RAN2 Meeting #64 R2-087070, Nov. 10-14, 2008, pp. 1-6.
3GPP TS 36.523-1 V8.0.0, User Equipment (UE) conformance specification, Part 1: Protocol conformance specification, Dec. 2008, pp. 1-497.
3GPP TSG-RAN2 Meeting #62bis, Correction to MAC PDU Format for Random Access Response, LG Electronics Inc., Apr. 7, 2008, R2-083370, pp. 1-5.
"Correction to UE transmission power headroom report for LTE", 3GPP TSG-RAN2 Meeting #63, Jeju Island, Korea, May 18-22, 2008, R2-083897, 5 pages.
Amitava Ghosh et al., "Random Access Design for UMTS Air-Interface Evolution", Networks and Enterprise Business, Motorola, Apr. 22, 2007, pp. 1041-1045.
LG Electronics, "Message 2 Structure with Back-Off Parameters", 3GPP TSG-RAN WG2 #61, R2-081035, Feb. 2008, 3 pages.
LG Electronics, "Discussion on random access back-off procedure", 3GPP TSG-RAN WG2 #60bis, R2-080189, Jan. 2008, 6 pages.
MAC Rapporteurs et al., "E-UTRA MAC protocol specification update", 3GPP TSG-RAN2 meeting #61bis, R2-081719, Apr. 2008, 1 page.
NTT DoCoMo, Inc., "RA response format", 3GPP TSG RAN WG2 #60bis, R2-080451, Jan. 2008, 6 pages.
LG Electronics Inc., "Missing condition for unsuccessful reception of Msg2", 3GPP TSG-RAN2 meeting #64bis, R2-090323, Jan. 2009, 3 pages.
"$3^{rd}$ Generation Partnership Project; Technical Specification Group Radio Access Network; Evolved Universal Terrestrial Radio Access (E-UTRA) Medium Access Control (MAC) protocol specification (Release 8)", 3GPP TS 36.321. V8.2.0, May 2008, XP050377618, pp. 1-497.
Technical Specification Group Radio Access Network; Evolved Universal Terrestrial Radio Access (E-UTRA) Medium Access Control (MAC) protocol specification; (3GPP TS 36.321, 2008.6), Jun. 2008, 7 pages.
Texas Instruments Inc., "Handover Failure Handling", 3GPP TSG-RAN WG2 Meeting #61, R2-082504, Feb. 2008, 7 pages.
LG Electronics Inc., "Correction to Multiplexing Procedure for BSR", 3GPP TSG-RAN2 Meeting #62bis, R2-083275, Jun.-Jul. 2008, 2 pages.
Infineon, "TP for the UL logical channel prioritization", 3GPP TSG RAN WG2 Meeting #62, R2-082504, May 2008, 3 pages.
LG Electronics Inc., "BSR Priority", 3GPP TSG-RAN WG2 #61bis, R2-081589, Apr. 2008, 1 page.
MAC Rapporteurs, "36.321 CR covering agreements of RAN2 #61bis and RAN2#62", 3GPP TSG-RAN2 Meeting #62, R2-082902, May 2008, 2 pages.
Panasonic, "Priority handling of MAC Control Elements", 3GPP TSG RAN WG2#62, R2-082227, XP-00253751, May 2008, 1 page.
TS 36.321 V8.1.0, Mar. 2008, 7 pages.
Alcatel-Lucent, "TP on Power Headroom reporting", 3GPP TSG RAN WG2#62, R2-082224, May 2008, 7 pages.
Nokia Corporation et al., "Power Headroom reporting" 3GPP TSG-RAN WG2 Meeting #62, R2-082197, May 2008, 4 pages.
Ericsson, "UE transmission power headroom report for LTE", 3GPP TSG RAN WG2#62, R2-082147, May 2008, 4 pages.
Nokia Siemens Network et al., "Triggers for Power Headroom Reports in EUTRAN Uplink", 3GPP TSG RAN WG1 #52 Meeting, R2-080947, Feb. 2008, 3 pages.
Nokia Corporation et al., "Scheduling Information for E-UTRAN uplink", 3GPP TSG-RAN WG2 Meeting #59bis, R2-073909, Oct. 2007, 3 pages.
MAC Rapporteurs, "E-UTRA MAC protocol specification update", 3GPP TSG-RAN2 Meeting #61, R2-081389, Feb. 2008, 25 pages.
Panasonic, "Clarification on 'Active Time' definition", 3GPP TSG RAN WG2#62, R2-082225, May 2008, 2 pages.
LG Electronics Inc., et al., "Restriction to PDCCH for Contention Resolution", 3GPP TSG-RAN WG2#62, R2-082509, May 2008, 2 pages.
LG Electronics Inc., "DL Grant in Random Access Response", 3GPP TSG-RAN WG2 #60, R2-074787, Nov. 2007, 3 pages.
ETSI TS 136300 V8.4.0, "Evolved Universal Terrestrial Radio Access (E-UTRA) and Evolved Universal Terrestrial Radio Access (E-UTRAN); Overall Description; Stage 2", XP014041816, Apr. 2008, pp. 1-129.
SunplmMobile Inc., "Align the DRX Active Time with RA procedure", 3GPP TSG-RAN WG2 Meeting #62bis, R2-083428, Jul. 2008, 5 pages.
LG Electronics Inc., "Correction to DRX", 3GPP TSG-RAN2 Meeting #62bis, R2-083274, Jun.-Jul. 2008, 3 pages.
MAC Rapporteurs, "E-UTRA MAC protocol specification update", 3GPP TSG-RAN2 Meeting #61bis, R2-081719, Mar.-Apr. 2008, 1 page.
LG Electronics, "Corrections to the Random Access Response Reception", 3GPP TSG-RAN WG2 #62, R2-082447, May 2008, 5 pages.
LG Electronics Inc., "Correction to RACH Procedure", 3GPP TSG-RAN2 Meeting #64, R2-086137, Nov. 2008, 6 pages.
CR Covering Agreements of RAN 2 #61bis; 3GPP Draft; R2-082049; XP050139679; Apr. 2008, pp. 1-43.
Disassembly, Demultiplexing and Multiplexing Functions; #GPP Draft; R2-091633; XP050323507; Feb. 2009, 5 pages.
Nokia Corporation, et al., Message 3 Definition, 3GPP TSG-RAN2 Meeting #64, R2-086077, Oct. 14, 2008, 8 pages.
LG Electronics, Inc., et al., Counter proposal to R2-090969, Feb. 13, 2009, 4 pages.
3GPP TSG-RAN2 Meeting #65, Athens, Greece, Feb. 9-13, 2009, "Change Request", r2-091232, 4 pages.
3GPP TS 36.321 V8.3.0 (Sep. 2008), Technical Specification, $3^{rd}$ Generation Partnership Project; Technical Specification Group Radio Access Network; Evolved Universal Terrestrial Radio Access (E-UTRA) Medium Access Control (MAC) protocol specification (Release 8), Sep. 2008, 36 pages.
3GPP TS 36.321 V8.1.0 (Mar. 2008), Technical Specification, $3^{rd}$ Generation Partnership Project; Technical Specification Group Radio Access Network; Evolved Universal Terrestrial Radio Access (E-UTRA) Medium Access Control (MAC) protocol specification (Release 8), Mar. 2008, pp. 1-30.
3GPP TSG-RAN2 Meeting #62, Kansas City, U.S.A., May 5-9, 2008, Change Request, R2-082902, 2 pages.
3GPP TS 36.321 v8.2.0 (May 2008), Technical Specification, "$3^{rd}$ Generation Partnership Project; Technical Specification Group Radio Access Network; Evolved Universal Terrestrial Radio Access (E-UTRA) Medium Access Control (MAC) protocol specification (Release 8)", May 2008, pp. 1-33.
Nokia Siemens Networks, Nokia, "Triggers for Power Headroom Reports in EUTRAN Uplink", 3GPP TSG RAN WG1 Meeting #52bis, Shenzhen, China, Mar. 31-Apr. 4, 2008, R1-081464, 3 pages.
LG Electronics Inc. et al. "Reflection of RAN1 LS on timing adjust and addition of MAC in random access response", 3GPP TSG-RAN2 Meeting #64 R2-086374, Nov. 14, 2008, 6 pages.
Huawei, "Corrections to Random Access Procedure", 3GPP TSG-RAN WG2 Meeting #64 R2-087042, Nov. 14, 2008, 4 pages.
Dalman et al., "3G evolution HSPA and LTE for mobile broadband," Elsevier, Edition 2, p. 441 Oct. 2008.
Chinese Fifth Office Action dated Apr. 29, 2015 in CN 200980123161.7 and English translation, 8 pages.
European Office Action dated Aug. 12, 2015 in EP 09007290.3, 4 pages.
European Summons to attend oral proceedings dated May 11, 2017 in EP 09007920.3, 6 pages.

* cited by examiner (a) Contention based RACH (b) Non-contention based RACH

METHOD FOR PERFORMING RANDOM ACCESS PROCEDURES AND TERMINAL THEREOF

CROSS-REFERENCE(S) RELATED APPLICATION

This is a continuation of U.S. application Ser. No. 14/591,399, filed Jan. 7, 2015, now U.S. Pat. No. 9,432,937, which claims the benefit of, and is a continuation of, U.S. application Ser. No. 13/894,948, filed May 15, 2013, now U.S. Pat. No. 8,934,391, which is a continuation of U.S. application Ser. No. 13/071,280, filed Mar. 24, 2011, now U.S. Pat. No. 8,467,343, which is a continuation of U.S. application Ser. No. 12/457,653, filed Jun. 17, 2009, now U.S. Pat. No. 7,933,243, which claims priority benefit to U.S. Provisional Application Nos. 61/073,743, filed Jun. 18, 2008, and 61/074,998, filed Jun. 23, 2008, and Korean Patent Application No. 10-2009-0048775, filed Jun. 2, 2009, the entire contents of each of the aforementioned applications are hereby incorporated by reference for all purposes as fully set forth herein.

BACKGROUND

The present invention relates to an apparatus and method for performing random access procedures. In the related art, random access procedures were not performed efficiently. As such, the related art technologies do not sufficiently address such issues, and thus do not offer appropriate solutions.

SUMMARY

The present inventors recognized at least the above-identified drawbacks of the related art. Based upon such recognition, the various features described hereafter have been conceived such that a random access procedure between a mobile terminal and a network is performed based upon the characteristics of a random access channel (RACH) preamble. As a result, more efficient monitoring of downlink channels can be performed, which results in reduced power consumption.

DETAILED DESCRIPTION

The inventive concepts and features herein are explained in terms of a Long Term evolution (LTE) system or other so-called 4G communication systems, which is an enhancement to current 3GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

Embodiments of the present invention relate to sending and receiving data between a base station (e.g. Node B, eNB, access point, etc.) and a mobile station (e.g. mobile terminal, UE, user device, etc.) in a Long Term Evolution (LTE) system. Power consumption of the mobile terminal can be reduced to a minimum and a downlink channel can be more effectively monitored because a reception time for the downlink channel is determined according to the characteristics of a preamble for a mobile terminal that performs random access.

Second generation (2G) mobile communications relate to transmitting and receiving voice signals in a digital manner, and include technologies such as CDMA, GSM, and the like. As an enhancement from GSM, GPRS was developed to provide packet switched data services based upon GSM.

Third generation (3G) mobile communications relate to transmitting and receiving not only voice signals, but also video and data. The 3GPP (Third Generation Partnership Project) developed the IMT-2000 mobile communication system and selected WCDMA as its radio access technology (RAT). The combination of IMT-2000 and WCDMA can be referred to as UMTS (Universal Mobile Telecommunications System), which comprises a UMTS Terrestrial Radio Access Network (UTRAN).

As data traffic is expected to increase dramatically, the standardization for 3.sup.rd generation mobile communications is underway to establish a Long-Term Evolution (LTE) network that supports greater bandwidth. LTE technologies are employed for an Evolved-UMTS (E-UMTS), which has an Evolved-UTRAN (E-UTRAN) that uses OFDMA (Orthogonal Frequency Division Multiple Access) as its radio access technology (RAT).

Figure 1:
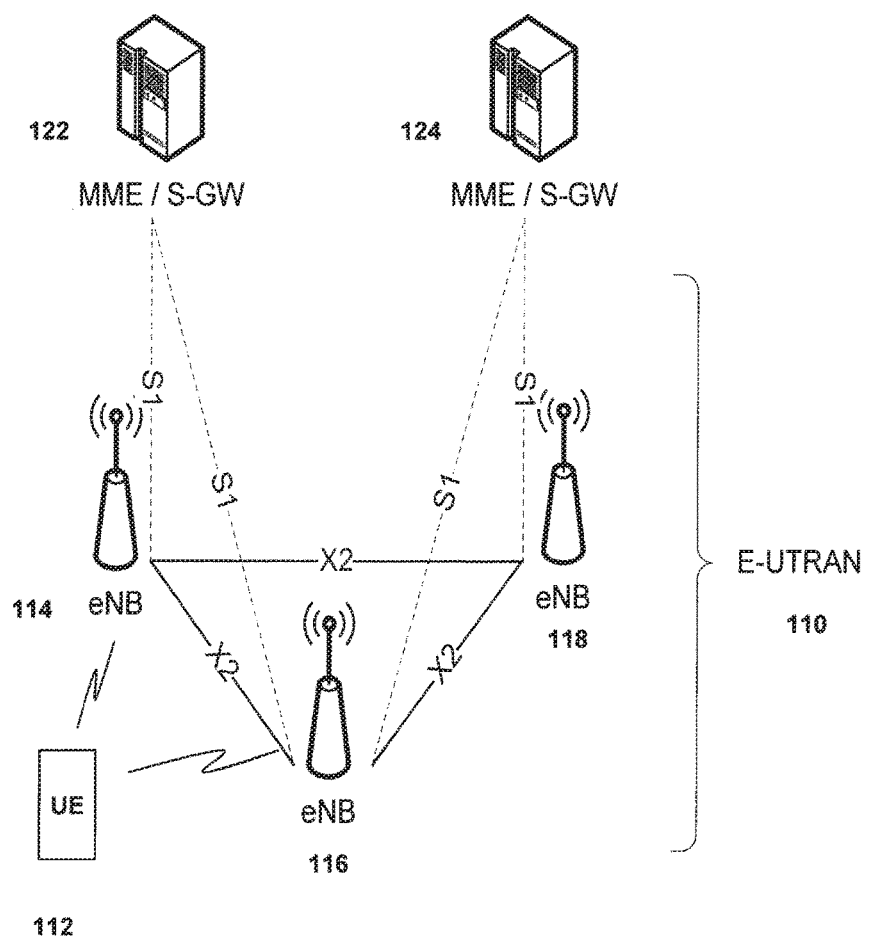
FIG. 1 shows an exemplary network architecture for an E-UMTS (Evolved Universal Mobile Telecommunications System).

FIG. 1 shows the exemplary network architecture for an E-UMTS (Evolved Universal Mobile Telecommunications System) 100, which is a type of mobile communications system. The E-UMTS system is a system that has evolved from the UMTS system and its basic standardization tasks are now being performed by the 3GPP organization. The E-UMTS system can be said to be a Long Term Evolution (LTE) system, which is a type of so-called 4G or next generation system that has evolved from the current 3G mobile communication systems.

The E-UMTS network 100 can be generally distinguished into the E-UTRAN (Evolved Universal Terrestrial Radio Access Network) 110 and the CN (core network). The E-UTRAN is comprised of a mobile terminal 112 (e.g. user equipment (UE), mobile station, handset, mobile phone, etc.), a base station 114, 116, 118 (e.g., an eNode B, access point (AP), network node, etc.) a serving gateway (S-GW) 122, 124 located at an end of the network for connection with an external network, and a mobility management entity (MME) 122, 124 that manages various mobility aspects of the mobile terminal. For a single eNode B, one or more cells (or regions, areas, etc.) may exist.

Figure 2:
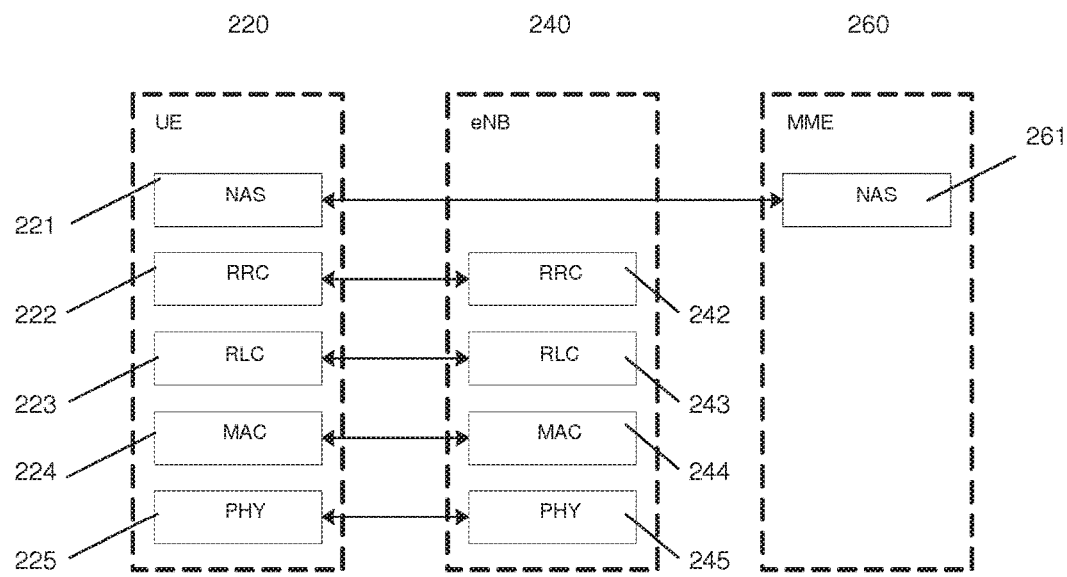
FIG. 2 shows an exemplary radio interface protocol architecture for the control plane between the mobile terminal (UE) and the network (eNB, MME).
Figure 3:
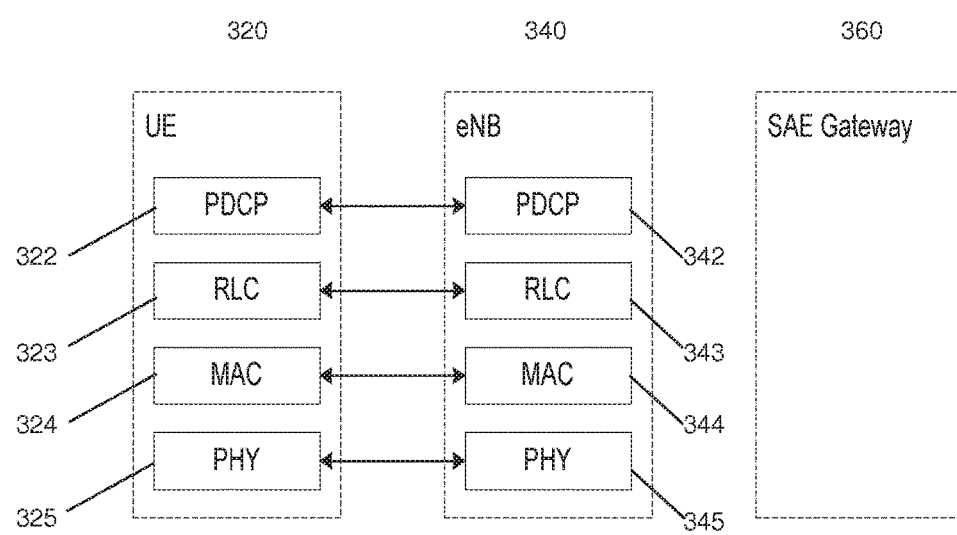
FIG. 3 shows an exemplary radio interface protocol architecture for the user plane between the mobile terminal (UE) and the network (eNB, SAE Gateway).

FIGS. 2 and 3 show the radio interface protocol between the mobile terminal and base station based on the 3GPP radio access network standard. This radio interface protocol is divided horizontally into a physical layer, a data link layer, and a network layer, and is divided vertically into a user plane for transmitting data information and a control plane for transferring control signals (signaling). These protocol layers can be divided into L1 (Layer 1), L2 (Layer 2), and L3(Layer 3), which are the lower three layers of the OSI (Open System Interconnection) standard model, which is well known in communication systems.

Hereafter, the control plane of the radio protocol in FIG. 2 and the user plane of the radio protocol in FIG. 3 will be described respectively.

In Layer 1, the physical layer 225-245, 325-345 uses one or more physical channels to provide an information transfer service. The physical layer is connected to the MAC (Medium Access Control) layer 224-244, 324-344 located above via one or more transport channels, and data is transferred between the MAC layer and the physical layer through these transport channels. Also, between respectively different physical layers, such as the physical layer in the transmitter (transmitting side) and the physical layer in the receiver (receiving side), data is transferred via one or more physical channels.

The physical channels that exist for the physical layer in the transmitting side and in the receiving side include: SCH (Synchronization Channel), PCCPCH (Primary Common Control Physical Channel), SCCPCH (Secondary Common Control Physical Channel), DPCH (Dedicated Physical Channel), PICH (Paging Indicator Channel), PRACH (Physical Random Access Channel), PDCCH (Physical Downlink Control Channel) and PDSCH (Physical Downlink Shared Channel) and the like.

In L2 (Layer 2), the MAC layer provides service to a RLC (Radio Link Control) layer 223-243, 323-343, which is an upper layer, via one or more logical channels. Here, based upon the type of data being transmitted, the logical channels can be divided into control channels that are used to transmit control plane data, and traffic channels that are used to transmit user plane data.

In L2 (Layer 2), the RLC layer supports the transmission of data with reliability. Each radio bearer (RB) is responsible to the guarantee of QoS (Quality of Service) and transmits data accordingly. In order to guarantee the QoS that is unique to the RB, one or two independent RLC entities are provided for each RB, and three types of RLC modes (TM: Transparent Mode, UM: Unacknowledged Mode, and AM: Acknowledged Mode) are provided to support various QoS.

In L2 (Layer 2), the PDCP (Packet Data Convergence Protocol) layer 322-342 in Layer 2performs a header compression function to reduce the header size for Internet Protocol (IP) packets that contain relatively large and unnecessary control information such that IP packets (such as for IPv4, IPv6, etc.) may be effectively transmitted over the radio interface having relatively small bandwidth. Also, the PDCP layer is used for performing coding of control plane (C-plane) data, such as RRC messages. The PDCP layer can also perform coding of user plane (U-plane) data.

Located at the uppermost portion of Layer 3, the RRC (Radio Resource Control) layer 222-242 is only defined in the control plane and is responsible for the control of logical channels, transport channels and physical channels with relation to the configuration, re-configuration and release of radio bearers (RBs). Here, a radio bearer is a service provided by Layer 2 for transferring data between the mobile terminal and E-UTRAN. Here, the RB refers to a service provided by Layer 2 to transfer data between the UE and the E-UTRAN.

Hereafter, aspects of the RACH (Random Access CHannel) procedure will be explained. The RACH procedure is used for transmitting relatively short length data via the uplink. In particular, the RACH procedure is used when there is a signaling message or user data to be transmitted via the uplink by a mobile terminal that did not receive allocation of dedicated radio resources, or may also be used when the base station should instruct the mobile terminal to perform a RACH procedure.

Next, the random access procedure provided in an LTE system will be explained. The random access procedure provided in the LTE system can be classified as a contention based random access procedure and a non-contention based procedure. Such classification is based upon whether the random access preamble is selected by the mobile terminal itself (i.e. preamble selected by the MAC in the mobile terminal) or selected by the base station (i.e. receiving information about the preamble to be used through explicit signaling).

In a non-contention based random access procedure, the mobile terminal uses the preamble that was directly allocated to it from the base station. Thus, if the base station had allocated a particular random access preamble to the mobile terminal, such random access preamble is only used by that mobile terminal, while other mobile terminals do not use such random access preamble. Accordingly, because there is a one-to-one (1:1) relationship between the random access preamble and the mobile terminal that uses such random access preamble, there are no contentions (or conflicts) between multiple mobile terminals. In such case, upon receipt of such random access preamble, the base station can immediately know which mobile terminal transmitted such random access preamble, and thus it can be said that more efficient operation is possible.

In contrast, for a contention based random access procedure, because the mobile terminal sends transmission upon selecting a particular random access preamble among those that may be used, there is the possibility that multiple mobile terminals use the same random access preamble. Thus, even upon reception of a particular random access preamble, the base station cannot accurately know which mobile terminal transmitted on such random access preamble.

The mobile terminal performs a random access procedure for at least the following exemplary situations: upon performing an initial access when there is no radio resource control (RRC) connection with the base station; upon initial access to a target cell while the mobile terminal is in handover; upon request by a command of the base station; upon generation of data for the uplink, when uplink time synchronization is not correct or when designated radio resources to be used in appropriate requesting radio resources have not yet been allocated; during a correction (e.g. decoding, reconstruction, recovery, etc.) procedure when there is a radio link failure or handover failure.

Figure 4:
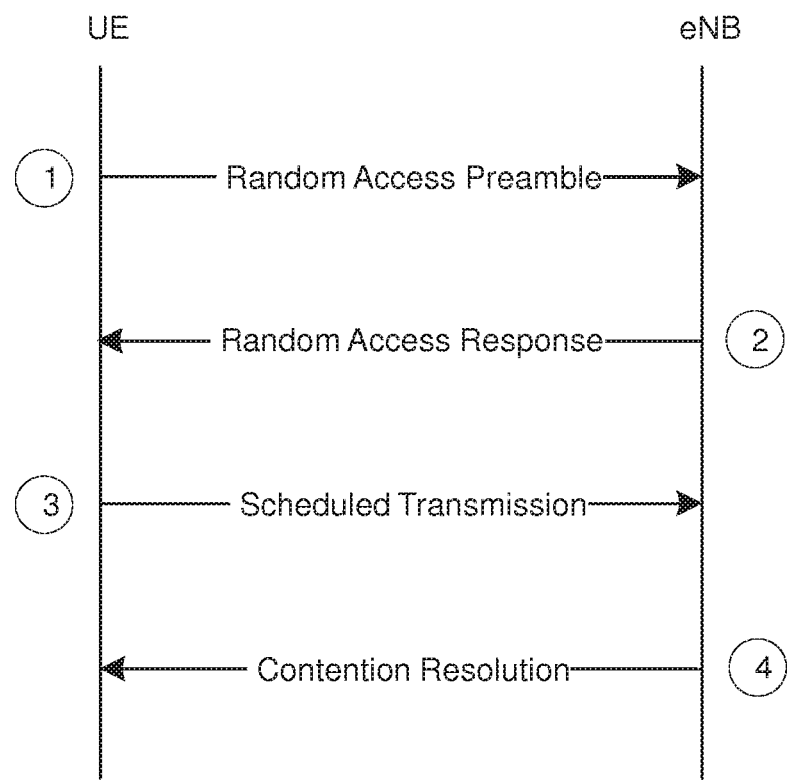
FIG. 4 shows an exemplary signal flow diagram of a contention based random access procedure between the mobile terminal (UE) and the base station (eNB).
Figure 5:
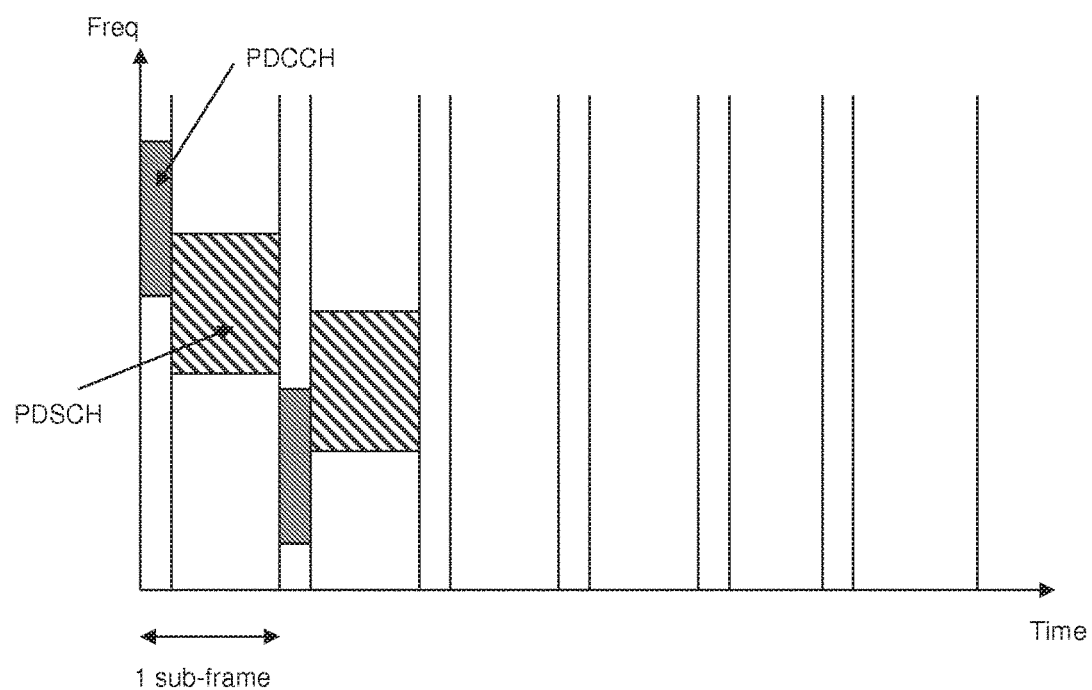
FIG. 5 shows an exemplary relationship among certain channels (PDCCH and PDSCH) between the base station and mobile terminal.

Based upon the above explanations, the operations between the mobile terminal and the base station for a contention based random access procedure will be explained with reference to FIG. 4 (that includes steps 1 through 4).

Step 1

In a contention based random access procedure, the mobile terminal selects (e.g. at random) one random access preamble among a set of random access preambles indicated via system information or a handover command, then selects PRACH resources that can be used to transmit such random access preamble, and then performs transmission. Here, such preamble is called a RACH MSG 1. When the mobile terminal itself ("randomly") selects the preamble (i.e. the preamble selected by the MAC itself), such is called a contention-based RACH procedure, and the preamble is called a contention-based preamble. If the mobile terminal receives allocation of the preamble directly from the network through the RRC or PDCCH (i.e. an explicitly signaled preamble), this is called a non-contention based RACH procedure, and such preamble is called a dedicated preamble.

Step 2

After transmitting the random access preamble as selected above, the mobile terminal attempts to receive its random access response within a random access response reception window indicated from the base station via system information or handover command. In more detail, the random access response information (typically called a RACH MSG 2) is transmitted in the form of a MAC PDU, which is delivered via the PDSCH, and the information related to the radio resources for the PDSCH is delivered through the PDCCH via the RA-RNTI.

The random access response includes values comprising a random access preamble identifier (ID), a UL Grant (for uplink radio resources), a Temporary C-RNTI (a temporary cell identifier), and a Time Alignment Command (a value for time synchronization adjustment).

If the random access preamble identifier (ID) is the same as (i.e. matches) the random access preamble transmitted in step 1) above, especially while a contention based random access preamble procedure is in progress, the mobile terminal uses the information related to the uplink radio resources and performs the following step 3). If a dedicated preamble is used in step 1), and if the random access preamble identifier (ID) included in RACH MSG 2 and the random access preamble transmitted by the mobile terminal in step 1) are the same (i.e. matches), the RACH procedure is considered to be ended or terminated.

Step 3

If the mobile terminal receives a random access response (RAR) that is meant for itself (i.e. the RAR is a valid response for that mobile terminal), the information within such random access response is processed, respectively. Namely, the mobile terminal applies the Time Alignment Command and stores the Temporary C-RNTI. Also, the UL Grant is used to transmit the data stored in its buffer or to transmit newly generated data to the base station. Here, the data transmitted by using the UL Grant (i.e., the MAC PDU) is commonly called RACH MSG 3. Among the data (i.e. RACH MSG 3) included in the UL Grant, the mobile terminal identifier (ID) must be included. This is because in a contention based random access procedure, the base station cannot determine which mobile terminal performed such random access procedure, and in order to prevent or resolve any future contentions or conflicts, information that can be used to identify the mobile terminal would be required.

In the above procedure, there are two ways to include the identifier for the mobile terminal. For the first way, if the mobile terminal already has a valid cell identifier (C-RNTI) allocated from the base station (eNB) of the corresponding cell before the random access procedure is performed, the mobile terminal transmits such cell identifier via the UL Grant. For the second way, if the mobile terminal did not receive allocation of a unique cell identifier from the eNB, the mobile terminal includes its core network identifier (e.g., S-TMSI, Random ID, etc.) and performs transmission. After transmitting data using the UL Grant, the mobile terminal starts a contention resolution timer in order to solve any contention (conflict) problems.

Step 4

After transmitting data (that includes its identifier) using the UL Grant included in the random access response, the mobile terminal waits for commands from the base station for resolving contentions. Namely, reception of the PDCCH is attempted in order to receive a particular message. There are two ways to receive the PDCCH. As stated previously, if the identifier transmitted by using the UL Grant is a cell identifier (C-RNTI) allocated to the mobile terminal from the eNB, the mobile terminal attempts reception of the PDCCH by using its cell identifier, and if the identifier is an identifier that was allocated through the core network, attempt to receive the PDCCH is performed by using the Temporary C-RNTI included in the random access response.

Afterwards, for the former case (i.e. C-RNTI), if the PDCCH (referred to a RACH MSG 4 hereafter) is received (by using its cell identifier) before expiration of the contention resolution timer, then it is considered that the mobile terminal performed the ransom access procedure in a normal manner and the random access procedure is ended (terminated). For the latter case (i.e. Temporary C-RNTI), if the PDCCH was received through the temporary cell identifier before expiration of the contention resolution timer, the data (referred to as RACH MSG 4 hereafter), which is delivered by the PDSCH that is indicated by the PDCCH, is checked. If such data contains a unique identifier for the mobile terminal itself, it is considered that the mobile terminal performed the random access procedure in a normal manner, and the random access procedure is ended (terminated). The message or MAC PDU received in this step 4) is commonly called RACH MSG 4.

Step 5

In case the contention resolution timer has expired (i.e., a Temporary C-RNTI or a cell identifier for the mobile terminal is not received before expiration of the contention resolution timer), the mobile terminal considers the RACH procedure to be a failure. As a result, an appropriate back-off timer is operated (started) and the RACH procedure beginning from step 1) above is started again after expiration of such back-off timer.

Hereafter, a method for the mobile terminal in an LTE system to receive downlink data will be explained.

On the downlink, there are basically two types of physical channels: PDCCH and PDSCH. The PDCCH is not directly related to transmitting user data, but used in transmitting control information needed for implementing (or using) physical channels. In more basic terms, it can be said that the PDCCH is used in controlling other physical channels. In particular, the PDCCH is used in transmitting information necessary for the mobile terminal to receive the PDSCH. With respect to data that is transmitted at a particular point in time using a particular frequency bandwidth, information about what mobile terminal such data is intended for, the size of such data being transmitted, and the like is transmitted via the PDCCH. Accordingly, each mobile terminal receives the PDCCH at a particular time (e.g., TTI: transmission time interval) and checks whether any data (that should be received) was transmitted. If there is an indication that data (which should be received) was indeed transmitted, the PDSCH is additionally received by using the information (such as the appropriate frequency, etc.) indicated by the PDCCH. It can be said that information indicating as to what mobile terminal (i.e. a single UE or multiple UEs) the data of the PDSCH is being transmitted to, information indicating how the mobile terminal(s) should receive and decode the PDSCH data, and the like are transmitted via a physical channel, i.e. the PDCCH (Physical Downlink Control Channel).

For example, in a particular sub-frame, let us assume that radio resource information A (e.g. frequency location), transmission format information B (e.g. transmission block size, modulation and coding information, etc.), and RNTI (Radio Network Temporary Identity) information C undergo CRC (Cyclic Redundancy Check) masking and transmitted via the PDCCH. One or more mobile terminals in a corresponding cell use the RNTI information that it has in order to monitor the PDCCH, and referring to the above assumption, for a mobile terminal having RNTI information C, when the PDCCH is decoded, CRC errors do not occur. Accordingly, such mobile terminal uses the transmission format information B and radio resource information A to decode the PDSCH in order to receive data. In contrast, with respect to the above assumption, in a mobile terminal that does not have RNTI information C, CRC errors occur when the PDCCH is decoded, and thus such mobile terminal does not receive the PDSCH.

Through the above procedures, in order to inform about which mobile terminals have been allocated radio resources, a RNTI (Radio Network Temporary Identifier) is transmitted via each PDCCH, and such RNTI can be classified as a dedicated RNTI or a common RNTI. A dedicated RNTI is allocated to a single mobile terminal and is used for transmitting and receiving data corresponding to that mobile terminal. Such dedicated RNTI is only allocated to those mobile terminals having their information registered in the base station (eNB). In contrast, a common RNTI is used by those mobile terminals that do not have their information registered in the base station (eNB) and cannot be allocated a dedicated RNTI, in order to send and receive data with the base station or used for transmitting information (such as system information) that is commonly applied to a plurality of mobile terminals.

Meanwhile, the two main elements that comprise the E-UTRAN are the base station and the mobile terminal. The radio resources for a single cell are comprised of uplink radio resources and downlink radio resources. The base station is responsible for the allocation and control of uplink radio resources and downlink radio resources of a cell. Namely, the base station determines what radio resources are to be used by what mobile terminals at certain moments in time. For example, the base station can determine that 3.2 seconds from now, the frequency from 100 MHz to 101 MHz will be allocated to user 1 for a duration of 0.2 seconds to allow downlink data transmissions. Also, after the base station makes such determination, these matters can be informed to the corresponding mobile terminal such that this mobile terminal receives downlink data. Likewise, the base station can determine when a certain mobile terminal should use what amount of which radio resources for data transmission via the uplink, and the base station informs the mobile terminal about its determination, to thus allow the mobile terminal to transmit data during the determined time period using the determined radio resources.

Unlike the related art, if the base station manages radio resources in a dynamic manner, efficient use of radio resources would be possible. Typically, a single mobile terminal continuously uses a single radio resource during a call connection. This is not preferable considering that most recent services are IP packet-based. The reason is that most packet services do not continuously generate packets during the duration of a call connection, and there are many time periods in which nothing is transmitted during the call. Despite this, continued allocation of a radio resource to a single mobile terminal is inefficient. To solve this, the mobile terminal of a E-UTRAN system uses a method in which radio resources are allocated to the mobile terminal only while service data exists.

Hereafter, some concepts of DRX will be explained. DRX refers to discontinuous reception and signifies the operations about when (i.e. at when point in time) the base station should send information related to radio resource allocation to the mobile station during the process of communication between the base station and the mobile terminal. Namely, a mobile terminal having to always monitor the downlink channel, in particular the PDCCH, would result in undesirable power consumption for the mobile terminal. Thus, to resolve this issue, the mobile terminal and the base station operate according to pre-established consistent rules, such that the base station sends radio resource allocation information via the PDCCH to the mobile terminal only at specific times. As a result, the mobile terminal only needs to monitor the PDCCH at certain specified times, which reduces power consumption thereof.

Some types of DRX operations are performed in the following manner.

Initially, an active time is defined. This active time denotes the time at which that the mobile terminal should wake up (from its idle state) to monitor a downlink channel, namely the PDCCH. After such active time, the mobile terminal need not monitor the PDCCH.

The active time may include the following types of time periods: [0060] 1) a time during which an On-Duration timer, or a DRX Inactivity timer, or a DRX Retransmission timer, or a Contention Resolution timer operates (=condition 1); [0061] 2) a time during which a Scheduling Request procedure is being performed; [0062] 3) a time during which a radio resource allocation message (for retransmissions) is sent, with respect to uplink transmissions; [0063] 4) a time during from after the RACH MSG 2 is transmitted up to the time when a C-RNTI or a Temporary C-RNTI (that indicates the allocation of radio resources for an initial or new transmission) is received (=condition 4).

With reference to the technical description thus far, the technical solution provided by the embodiments of the present invention can be described as follows.

In order to reduce power consumption, the DRX is performed also for the RACH procedure. The active time explained above can be considered in view of the RACH procedure.

Figure 6:
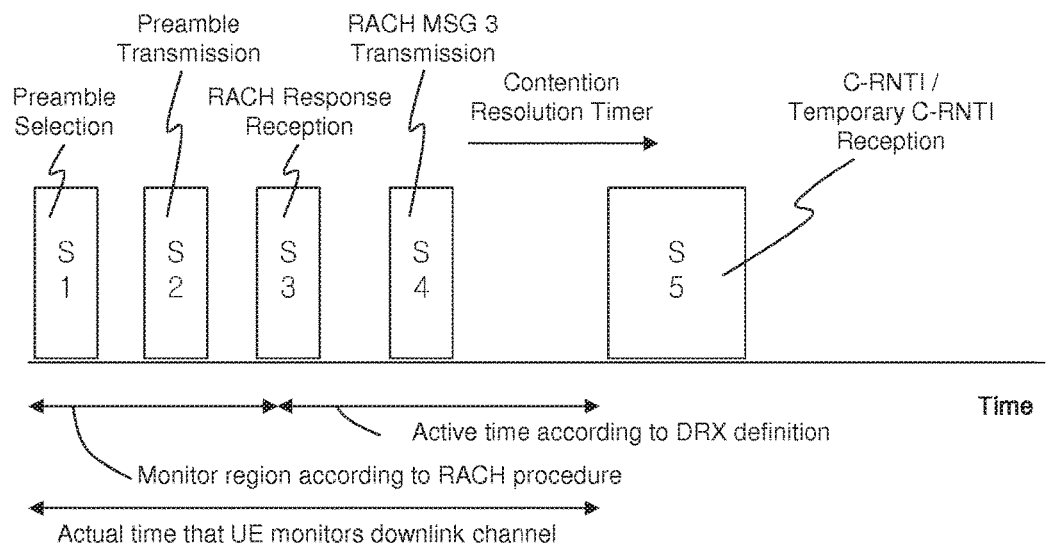
FIG. 6 is a conceptual diagram to explain a contention based random access procedure performed by the mobile terminal according to an exemplary embodiment.
Figure 7:
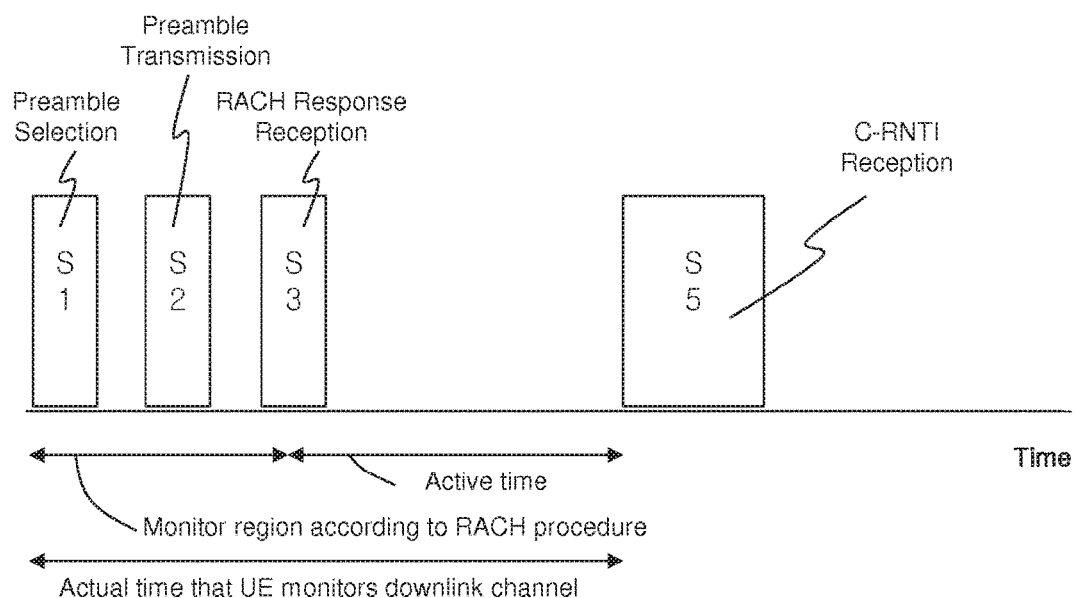
FIG. 7 is a conceptual diagram to explain a non-contention based random access procedure performed by the mobile terminal according to an exemplary embodiment.

FIGS. 6 and 7 shows RACH procedures performed by a mobile terminal for (a) Contention based and (b) Non-contention based situations. In (a) Contention based RACH, the active time denotes the time during which the mobile terminal should monitor the downlink channel. In (b) Non-contention based RACH, unlike in contention based RACH, there is no RACH MSG 3 transmission being performed. Also, a Temporary C-RNTI is not used.

Referring to FIG. 6, when the mobile terminal monitors a downlink channel (namely, the PDCCH), in order to reduce power consumption, discontinuous receptions (DRX) are performed with respect to the RACH procedure.

As this is a contention based random access procedure, the mobile terminal selects a preamble and this selected preamble is transmitted to the base station (network) (see S1 and S2). If the mobile terminal receives a random access response (RAR: RACH response, i.e. RACH MSG 2) from the base station, the information included in such random access response are individually processed (S3). Also, as a procedure for receiving a C-RNTI or a Temporary C-RNTI from the base station that informs about radio resource allocation, the mobile terminal sends data (i.e. a MAC PDU referred to as RACH MSG 3) via an uplink (UL) grant (S4). Additionally, the downlink channel (via which the C-RNTI or the Temporary C-RNTI will be transmitted) is monitored from the time when the preamble was selected until the C-RNTI or the Temporary C-RNTI is actually received (S5). Here, a DRX timer is operated (or started) and active from after receiving the RACH MSG 2 until the C-RNTI or the Temporary C-RNTI is received. A contention based resolution timer is operated (or started) after the RACH MSG 3 is transmitted until the C-RNTI or the Temporary C-RNTI is received.

FIG. 7 shows a conceptual diagram to explain a non-contention based random access procedure performed by the mobile terminal according to an exemplary embodiment. When compared to FIG. 6, the mobile terminal does not perform the step of transmitting the RACH MSG 3 to the base station (i.e. S4 of FIG. 6 is not performed) in the non-contention based situation. Also, the Temporary C-RNTI is not employed in the non-contention based situation. Here, the downlink channel monitoring period or duration of the RACH procedure is equivalent to that in FIG. 6.

It should be noted that in FIG. 6, the Contention based RACH shows the situation when the mobile terminal successfully performs the RACH procedure. However, if the mobile terminal actually fails in performing the RACH procedure, namely, if the C-RNTI or the Temporary C-RNTI is not received, then such failure situation in shown in FIG. 8.

Figure 8:
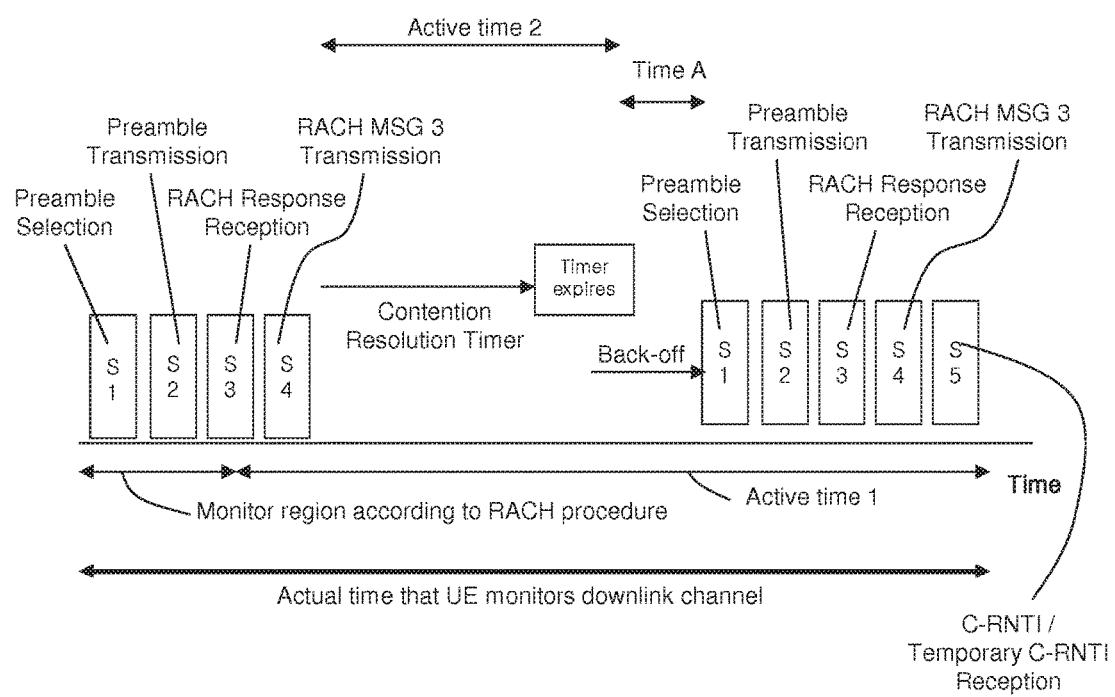
FIG. 8 is a conceptual diagram to explain a contention based random access procedure performed by the mobile terminal according to an exemplary embodiment for when the RACH procedure was unsuccessful.

In FIG. 8, active time 1 refers to the time duration as defined according to the active time condition 4 described above, while active time 2 refers to the time duration as defined according to the active time condition 1 described above.

As can been seen in FIG. 8, based upon the active time definitions above, the downlink channel must be monitored even during the back-off time. However, the actual back-off time is not a time period during which a contention resolution timer is being operated, and thus the network does not allocate radio resources to the mobile terminal by using the C-RNTI or the Temporary C-RNTI. Accordingly, because the mobile terminal need not actually perform monitoring, power consumption in unnecessarily wasted during this time period.

In order to solve this drawback, when performing a RACH procedure and monitoring a downlink channel in order to receive scheduling information, the mobile terminal should receive the downlink channel is a more efficient manner.

To achieve this, it is proposed that the mobile terminal should determine whether or not downlink channel monitoring should be performed at a particular point in time (or during a specific time period) based upon information regarding the type of on-going procedure that is being performed.

The mobile terminal may determine that it should monitor the downlink channel based upon whether or not the on-going procedure is a random access (RACH) procedure.

In performing downlink channel monitoring, for the mobile terminal to determine whether a particular time point (or period) is that for which downlink channel monitoring actually needs to be performed, and if the on-going procedure is a RACH procedure, then the information about the specific type of RACH procedure being performed should be referred to.

Namely, the mobile terminal will determine whether downlink channel monitoring should be performed or not by considering whether a contention based RACH procedure is being used or a non-contention based RACH procedure is being used.

A contention based RACH procedure means that the mobile terminal selects (at random or by some other criteria) a RACH preamble to be used in the RACH procedure. Namely, in this case, it is assumed that the MAC entity (in the mobile terminal) begins the RACH procedure. Thus, such MAC entity would select the preamble to be used.

A non-contention based RACH procedures means that the RACH procedure is performed by the mobile terminal using a directly (explicitly) indicated specific RACH preamble.

The specifics for the above procedures will be further explained hereafter.

Determining whether to receive the downlink channel according to the type of RACH procedure is used refers to the following. After the mobile terminal begins the RACH procedure, it is checked whether the RACH procedure is a contention based RACH procedure or a non-contention based RACH procedure.

If a non-contention based RACH procedure, the downlink channel is monitored during the period from when the RACH MSG 2 (i.e. random access response) was received up until a C-RNTI (that indicates allocation of radio resources for a new transmission) is received via the PDCCH. Namely, the time period, from after reception of the RACH MSG 2 (random access response) until reception of the C-RNTI (that indicates radio resource allocation for a new transmission) via the PDCCH, is included in the active time.

If a contention based RACH procedure, the downlink channel does not need to be monitored during the period from when the RACH MSG 2 (i.e. random access response) was received up until a C-RNTI (that indicates allocation of radio resources for a new transmission) is received via the PDCCH. Namely, the time period, from after reception of the RACH MSG 2 (random access response) until reception of the C-RNTI (that indicates radio resource allocation for a new transmission) via the PDCCH, is not included in the active time.

In other words, with respect to the time period (or duration) that begins from when the RACH MSG 2 (i.e. random access response) was received and ends when a C-RNTI (that indicates allocation of radio resources for a new transmission) is received via the PDCCH, such time period is not included in the active time for contention based RACH procedures, while such time period is included in the active time for non-contention based RACH procedures.

Put differently, the active time definition according to condition 4 (mentioned previously) is applied for instances where the RACH procedure is non-contention based (i.e., the RACH preamble is directly allocated from an external source to the MAC entity), while such condition 4 is not applied for other situations.

Thus, in embodiments of the present invention, the RACH procedure being used is checked to see if it is contention based or non-contention based, and depending on such checking, the time period from reception of the RACH MSG 2 up to the reception of information via the PDCCH in the form of a C-RNTI that indicates radio resource allocation for a new transmission, is included in the active time such that downlink channel reception can be determined.

Figure 9:
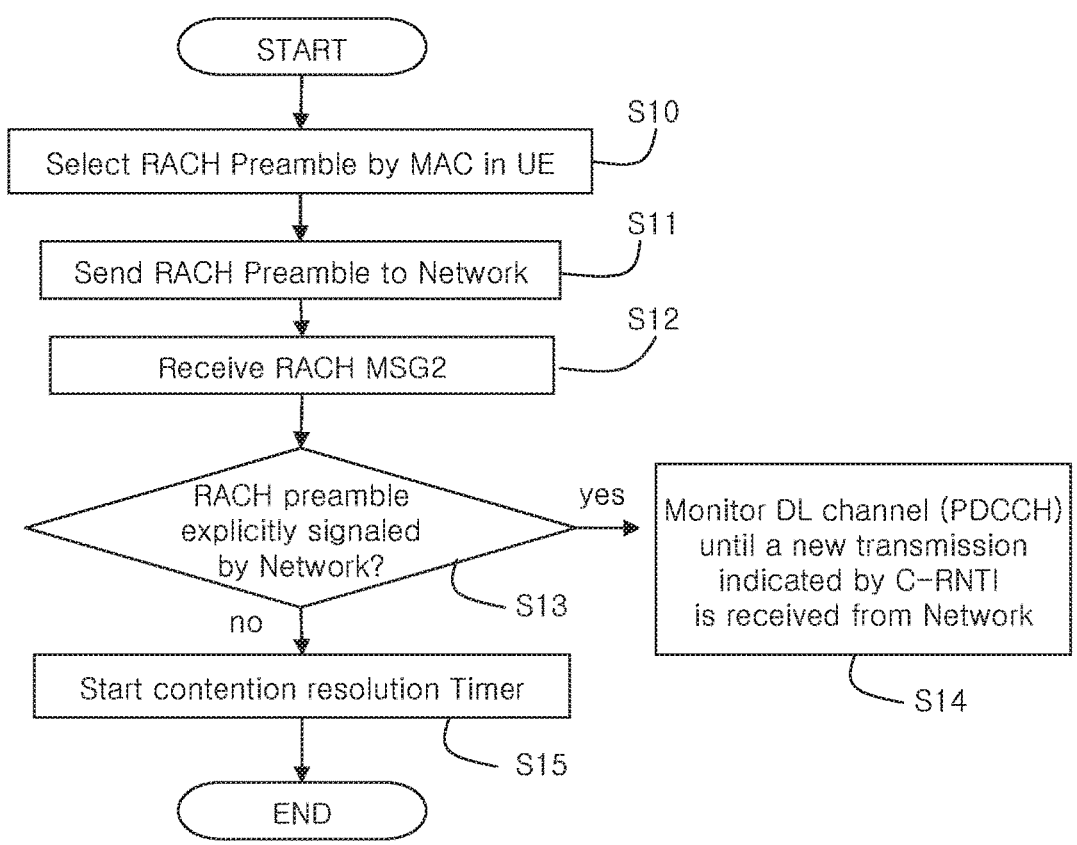
FIG. 9 shows a flow chart of a random access procedure performed by the mobile terminal according to an exemplary embodiment.
Figure 10:
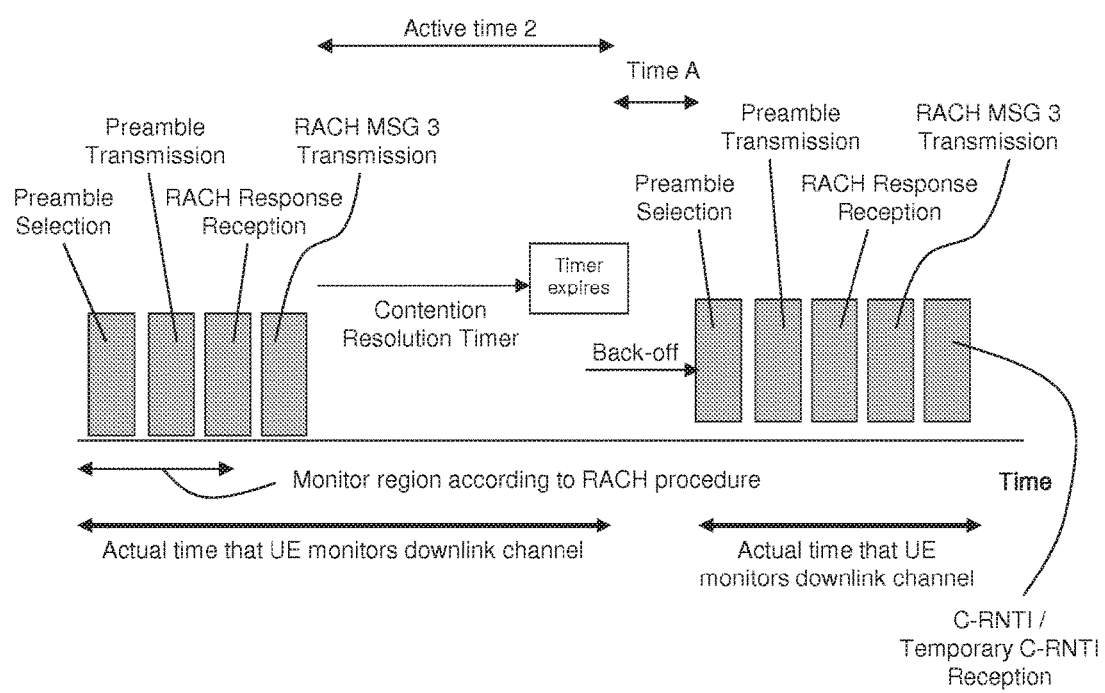
FIG. 10 is a conceptual diagram to explain the random access procedure of FIG. 9.

FIG. 9 shows a flow chart of a random access procedure performed by the mobile terminal according to an exemplary embodiment, while FIG. 10 is a conceptual diagram to explain the random access procedure of FIG. 9.

The MAC entity of the mobile terminal (UE) selects the RACH preamble, which is transmitted to the network (S10, S11). If the UE receives a random access response (RAR: RACH MSG 2) from the network, the information included in such RAR is processed (S12). Namely, by using the information in the RAR, it is determined whether the RACH preamble was selected by the MAC of the UE or explicitly signaled (or selected) by the network 9S13). If the RACH preamble was not selected by the MAC of the UE, namely, if explicitly signaled by the network, the UE monitors the downlink channel (PDCCH) until a new transmission is indicated by the radio resource allocation information (or scheduling information, such as C-RNTI) received from the network (S14).

However, if the RACH preamble was selected by the UE MAC, the contention resolution timer is started (S15). As such, the operation in FIG. 9 can also be understood from FIG. 10. Namely, as in the DRX procedure, when the UE receives a random access response (RAR: RACH MSG 2) from the network, the contention resolution timer is operated and the downlink channel (PDCCH) is monitored. However, if a C-RNTI is not received upon expiration of the contention resolution timer via the downlink channel being monitored, the UE performs the random access procedure again after a back-off time is applied. Here, the downlink channel is not monitored upon expiration of the contention resolution timer. The downlink channel is monitored when the random access procedure is performed again after the back-off time. As shown in FIGS. 9 and 10, as the UE does not monitor the downlink channel during the back-off time, power consumption due to unnecessary DRX operations can be avoided.

The mobile terminal may include a communication module (which may consist of hardware, software, or a combination thereof) that is configured to implement the operations described with respect to FIGS. 6 through 10. Also, the mobile terminal according to the present invention includes various types of hardware, such as an input/output means (e.g. display screen, keypad, speakers, etc.) and a microprocessor (or other control means) that provide control operations, as well as software used to implement various operations.

FIG. 10 illustrates how the concepts in the embodiments of the inventive features described herein can be implemented. Here, the situation where the mobile terminal failed in performing the RACH procedure, namely, when the C-RNTI or Temporary C-RNTI is not received, is shown.

As understood from FIG. 10, the active time defined according to condition 4 (mentioned previously) is not applicable because a contention based RACH procedure is being used. Thus, during the time in which the back-off time is applied, the mobile terminal need not monitor the downlink channel. As a result, undesired power consumption can be reduced.

Regarding the effects from implementing the embodiments described herein, with respect to downlink channel monitoring performed by the mobile terminal, the specific monitoring period (of the downlink channel, e.g. PDCCH) can be set in a more improved manner such that battery power efficiency (i.e. power source control) is enhanced.

Some more details about the concepts and features of the inventive embodiments described herein can also be summarized as follows.

The DRX Command MAC CE may be used to put a UE directly into either short or long DRX Cycle. But when a DRX Command MAC CE is received while the DRX Short Cycle Timer is running, the timer should not be affected. If the timer is started again (i.e. re-started), the UE is further put in wake-up state, causing more battery consumption. This situation can occur when HARQ Re-transmission Grant for a MAC PDU which includes the DRX Command MAC CE is received while the Short DRX Cycle Timer is running. Here, the terms "start" and "re-start" may be distinguished such that "start" is used when the timer is not running, while "re-start" is used when the timer is running. Thus, when the Short DRX Cycle Timer is running, it cannot be started, but it can be restarted.

However, such potential problem may be avoided by implementing the following concept: when DRX Command MAC CE is received while Short DRX Cycle Timer is running, the MAC CE is ignored.

The Active Time may include "a PDCCH indicating a new transmission addressed to the C-RNTI or Temporary C-RNTI of the UE has not been received after successful reception of a Random Access Response (RAR)." This would cover the period between the time of RAR reception and the time of starting the contention resolution timer. Otherwise, the UE would monitor the DL channels longer than needed. For example, even after the contention resolution timer expires due to reception of no temporary C-RNTI, the UE would still monitor the DL channels.

However, such potential problem may be avoided by implementing the following: setting the Active Time to include the period between the time of successful reception of RAR and the time of starting the Contention Resolution timer (for the case of contention-based preamble).

In other words, the situations for a contention-based preamble can be clarified as above.

If UE has to wake up until the reception of C-RNTI regardless of other problems, the features described herein can be applied to situations for a dedicated preamble.

The maintenance of Uplink Time Alignment will be explained.

The UE may have a configurable Time Alignment Timer. The Time Alignment Timer is valid only in the cell for which it was configured and started.

If the Time Alignment Timer has been configured, the UE shall: when a Timing Advance MAC control element is received: apply the Timing Advance Command; start the Time Alignment Timer (if not running) or restart the Time Alignment Timer (if already running), when a Time Alignment Command is received in a Random Access Response message: [0107] if the Random Access Preamble and PRACH resource were explicitly signaled: apply the Time Alignment Command; start the Time Alignment Timer (if not running) or restart the Time Alignment Timer (if already running). else, if the Time Alignment Timer is not running or has expired: apply the Time Alignment Command; start the Time Alignment Timer; when the contention resolution is considered not successful, stop the Time Alignment Timer. else: ignore the received Time Alignment Command. when the Time Alignment Timer has expired or is not running: prior to any uplink transmission, use the Random Access procedure in order to obtain uplink Time Alignment. when the Time Alignment Timer expires: release all PUCCH resources; release any assigned SRS resources.

Discontinuous Reception (DRX) will be explained. The UE may be configured by the RRC with a DRX functionality that allows it to not continuously monitor the PDCCH. The DRX functionality consists of a Long DRX cycle, a DRX Inactivity Timer, a DRX Retransmission Timer, and optionally a Short DRX Cycle and a DRX Short Cycle Timer.

When a DRX cycle is configured, the Active Time includes the time: while the On-Duration Timer or the DRX Inactivity Timer or a DRX Retransmission Timer or the Contention Resolution Timer is running; or while a Scheduling Request is pending; or while an uplink grant for a retransmission can occur; or from the successful reception of a Random Access Response (RAR) to the starting of the Contention Resolution Timer.

Here, the Active Time can also be defined as: while a PDCCH indicating a new transmission addressed to the C-RNTI of the UE has not been received after successful reception of a Random Access Response, if the Random Access Preamble was explicitly signaled; or while the DL resuming timer is running. The DL resuming timer is started when successful RAR is received in case that the Random Access Preamble was explicitly signaled; (here, the DL resuming timer is stopped when the C-RNTI of the UE is received) (instead, it is also possible that the DL-resolution timer is started when a dedicated preamble is received over the PDCCH) or, from the successful reception of a Random Access Response (RAR) to the starting of the Contention Resolution Timer, if the Random Access Preamble was selected by the UE MAC.

When a DRX cycle is configured, the UE shall perform the following procedures for each sub-frame: start the On Duration Timer when [(SFN*10)+sub-frame number]modulo(current DRX Cycle)=DRX Start Offset; if a HARQ RTT Timer expires in this sub-frame and the data in the soft buffer of the corresponding HARQ process was not successfully decoded: start the DRX Retransmission Timer for the corresponding HARQ process. if a DRX Command MAC control element is received: stop the On Duration Timer; stop the DRX Inactivity Timer. if the DRX Inactivity Timer expires or a DRX Command MAC control element is received in this sub-frame: if the short DRX cycle is configured: if the DRX Short Cycle Timer is not running, start the DRX Short Cycle Timer; use the Short DRX Cycle. else: use the Long DRX cycle. if the DRX Short Cycle Timer expires in this sub-frame: use the long DRX cycle. during the Active Time, for a PDCCH-sub-frame except if the sub-frame is required for uplink transmission for half-duplex FDD UE operation: monitor the PDCCH; if the PDCCH indicates a DL transmission: start the HARQ RTT Timer for the corresponding HARQ process; stop the DRX Retransmission Timer for the corresponding HARQ process. if the PDCCH indicates a new transmission (DL or UL): start or restart the DRX Inactivity Timer. if a DL assignment has been configured for this sub-frame and no PDCCH indicating a DL transmission was successfully decoded: start the HARQ RTT Timer for the corresponding HARQ process. when not in active time, CQI and SRS shall not be reported.

Regardless of whether the UE is monitoring PDCCH or not the UE receives and transmits HARQ feedback when such is expected.

The inventive embodiments described herein can further be described as follows.

In the related art, the RACH preamble being contention based and non-contention based was not distinguished when performing a RACH procedure. This drawback can be overcome by defining the active time and certain conditions thereof accordingly. The PDCCH needs to be continuously monitored during the time between MSG2 and MSG 4. After receiving the MSG 2, it is determined whether the RACH preamble is contention based or non-contention based, and conditions are applied for situations that are contention based or non-contention based.

Here, it should be noted that the features about contention based and non-contention based RACH preambles could be described in other terms and expressions. For example, it can be said that a PDCCH indicating a new transmission addressed to the C-RNTI of the UE has not been received after successful reception of a Random Access Response for the explicitly signaled preamble. Here, the phrase 'explicitly signaled' typically refers to dedicated signaling, but there may be some situations where 'explicitly signaled' refers to non-dedicated signaling. Also, a preamble that is not explicitly signaled is equivalent to a preamble that is not selected by MAC. Additionally, if the PDCCH order is a specific value (=00000), then the procedure can go back to contention based.

This disclosure provides a method of performing discontinuous receptions (DRX), comprising: transmitting a RACH preamble to the network; receiving RAR (MSG 2) from the network; determining whether the transmitted preamble was explicitly signaled by the network; if explicitly signaled, monitoring a downlink channel (PDCCH) until a new transmission is indicated by a C-RNTI received from the network; and if not explicitly signaled, starting a contention resolution timer.

Also, this disclosure provides a method of performing discontinuous receptions (DRX), comprising: transmitting a RACH preamble to the network; receiving RAR (MSG 2) from the network; if the transmitted RACH preamble was determined to be explicitly signaled by the network, monitoring a downlink channel (PDCCH) until a new transmission is indicated by a C-RNTI received from the network; or if the transmitted RACH preamble was determined to be not explicitly signaled by the network, starting a contention resolution timer.

The features described herein can be summarized as follows.

A method of performing a random access procedure in a mobile communications system having a network and a mobile terminal, the method performed by the mobile terminal and comprising: transmitting a random access channel (RACH) preamble to the network; receiving a RACH response from the network that received the RACH preamble; monitoring a downlink channel using information included in the RACH response according to whether the RACH preamble is contention based or non-contention based; checking whether the random access preamble is contention based or non-contention based; and performing a discontinuous reception procedure according to whether the random access preamble is contention based or non-contention based.

Here, the information included in the RACH response can be used to determine whether the random access preamble is contention based or non-contention based. The monitoring can be performed until a new transmission is indicated by a C-RNTI received from the network.

A method of performing discontinuous receptions (DRX) in mobile communications employing a network and a mobile terminal, the method comprising: transmitting a RACH preamble to the network; receiving random access response (MSG 2) from the network; monitoring a downlink channel (PDCCH) until a new transmission is indicated by a C-RNTI received from the network, wherein the monitoring is performed if the transmitted RACH preamble was determined to be explicitly signaled by the network; or starting a contention resolution timer, wherein the starting is performed if the transmitted RACH preamble was determined to be not explicitly signaled by the network.

The RACH preamble explicitly signaled by the network is a preamble that is not selected by UE MAC. The RACH preamble explicitly signaled by the network is information included in a PDCCH order.

A method of performing a discontinuous reception (DRX) procedure in mobile communications employing a network and a mobile terminal, the method performed by the mobile terminal and comprising: starting a random access procedure by sending a random access preamble to the network; receiving a random access response from the network that received the random access preamble; checking whether the random access preamble is contention based or non-contention based; and performing a discontinuous reception procedure according to whether the random access preamble is contention based or non-contention based.

The discontinuous reception procedure is performed by either monitoring a downlink channel (PDCCH) if the random access preamble is non-contention based or starting a contention resolution timer if the random access preamble is contention based. The mobile terminal performs the random access procedure if at least one of the following conditions are met: upon performing an initial access when there is no radio resource control (RRC) connection with the base station; upon initial access to a target cell while the mobile terminal is in handover; upon request by a command of the base station; upon generation of data for the uplink, when uplink time synchronization is not correct or when designated radio resources to be used in appropriate requesting radio resources have not yet been allocated; and during a correction, decoding or reconstruction procedure when there is a radio link failure or handover failure.

Furthermore, the features described herein can be summarized as follows.

A method of performing a random access procedure between a mobile terminal and a network, the method comprising: transmitting a RACH (Random Access CHannel) preamble to the network; and monitoring a downlink channel by using information included in a RACH response received from the network.

The monitoring step comprises determining whether the RACH preamble was selected by a MAC entity of the mobile terminal by using the information included in the RACH response. The downlink channel is further monitored until a new transmission is indicated by a C-RNTI received from the network, if it is determined that the RACH preamble was explicitly signaled by the network. The method further comprising: starting a contention resolution timer, if it is determined that the RACH preamble was selected by the MAC entity of the mobile terminal. The downlink channel is a PDCCH (Physical Downlink Control CHannel).

A method of performing a random access procedure between a mobile terminal and a network, the method comprising: transmitting a RACH (Random Access CHannel) preamble to the network; receiving a RACH response from the network; monitoring a downlink channel until a new transmission is indicated according to radio resource allocation information received from the network, if the RACH preamble was explicitly signaled by the network; and starting a contention resolution timer, if the RACH preamble was selected by a MAC entity of the mobile terminal.

If the contention resolution timer expires, the downlink channel is no longer monitored. The downlink channel is a PDCCH (Physical Downlink Control CHannel). The method further comprising: using the information included in the RACH response to determine whether the RACH preamble was either explicitly signaled by the network or selected by the MAC entity of the mobile terminal. The radio resource allocation information is a C-RNTI (Radio Network Temporary Identifier).

A method of performing a random access procedure between a mobile terminal and a network, the method comprising: transmitting a RACH (Random Access CHannel) preamble to the network; receiving a RACH response from the network; determining whether the RACH preamble was explicitly signaled by the network; if the RACH preamble was explicitly signaled by the network, monitoring a downlink channel until a new transmission is indicated according to radio resource allocation information received from the network; and if the RACH preamble was not explicitly signaled by the network, starting a contention resolution timer.

The radio resource allocation information is a C-RNTI (Radio Network Temporary Identifier. The downlink channel is a PDCCH (Physical Downlink Control CHannel). If the contention resolution timer expires, the downlink channel is no longer monitored.

A mobile terminal comprising: a communications module configured to transmit a RACH (Random Access CHannel) preamble to the network, receive a RACH response from the network, determine whether the RACH preamble was explicitly signaled by the network, monitor a downlink channel until a new transmission is indicated according to radio resource allocation information received from the network if the RACH preamble was explicitly signaled by the network, and start a contention resolution timer if the RACH preamble was selected by a MAC entity of the mobile terminal.

The various features and concepts described herein may be implemented in software, hardware, or a combination thereof. For example, a computer program (that is executed in a computer, a terminal or a network device) for a method and system for performing a random access procedure between a mobile terminal and a network is performed based upon the characteristics of a RACH preamble may comprise one or more program code sections for performing various tasks. Similarly, a software tool (that is executed in a computer, a terminal or a network device) for a method and system for performing a random access procedure between a mobile terminal and a network is performed based upon the characteristics of a RACH preamble may comprise program code portions for performing various tasks.

The method and system for processing random access procedures according to the present invention are compatible with various types of technologies and standards. Certain concepts described herein are related to various types of standards, such as GSM, WCDMA, 3GPP, LTE, IEEE, 4G and the like. However, it can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network entities that can be configured for performing a random access procedure in a mobile communications system having a network and a mobile terminal.

As the various concepts and features described herein may be embodied in several forms without departing from the characteristics thereof, it should also be understood that the above described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A communications terminal configured to perform a random access procedure with a network, comprising:
a transmitter to transmit to the network a first type of random access preamble or a second type of random access preamble;
a receiver to receive a random access response sent from the network in response to transmission of the first type of random access preamble or the second type of random access preamble;
where the first type of random access preamble is based on a preamble selection by the communications terminal, the second type of random access preamble is not based on a preamble selection by the communications terminal, and the first type of random access preamble is a contention-based preamble for a contention-based random access procedure;
a contention resolution timer; and
processing circuitry to:
start operation of the contention resolution timer;
decode a downlink control channel while the contention resolution timer operates;
apply a back-off time when an indication of allocation of radio resources for a new transmission is not received by a time when the contention resolution timer expires;
stop decoding the downlink control channel during the back-off time; and
perform random access again after the back-off time.

2. The communications terminal in claim 1, wherein the processing circuitry is configured to:
increase power to monitor the downlink control channel after the back-off time expires.

3. The communications terminal in claim 1, wherein the random access response includes a random access preamble identifier, uplink channel grant information, timing adjustment information, and a temporary cell identifier, and wherein the processing circuitry is configured to:
when the random access response is intended for the communications terminal, control the transmitter to transmit data using the uplink channel grant information and including a communications terminal identifier allocated through a core network and different from the temporary cell identifier,
wherein the processing circuitry is configured to start operation of the contention resolution timer after transmission of the data.

4. The communications terminal in claim 3, wherein the processing circuitry is configured to:
monitor for the downlink control channel using the temporary cell identifier of the communications terminal while the contention resolution timer is operating;
when the downlink control channel is received using the temporary cell identifier of the communications terminal before the contention resolution timer expires, check data on a downlink shared data channel indicated by the received downlink control channel; and
when the checked data includes a unique identifier for the communications terminal, terminate the random access procedure.

5. The communications terminal in claim 1, wherein the indication of allocation of radio resources is indicated by a Cell-Radio Network Temporary Identifier (C-RNTI).

6. A communications terminal configured to perform a random access procedure with a network, comprising:
a transmitter to transmit a first type of random access preamble or a second type of random access preamble to the network;
a receiver to receive a random access response sent from the network in response to transmission of the first type of random access preamble or the second type of random access preamble, the random access response including a random access preamble identifier, uplink channel grant information, timing adjustment information, and a temporary cell identifier;
where the first type of random access preamble is based on a preamble selection by the communications terminal, the second type of random access preamble is not based on a preamble selection by the communications terminal, and the first type of random access preamble is a contention-based random access preamble,
a contention resolution timer; and
processing circuitry to:
when the random access response is intended for the communications terminal, control the transmitter to transmit data using uplink channel grant information and including a communications terminal identifier that is different from the temporary cell identifier, and
start the contention resolution timer after transmission of the data over the uplink.

7. The communications terminal in claim 6, wherein the processing circuitry is configured to:
monitor the downlink control channel using the temporary cell identifier of the communications terminal while the contention resolution timer is running;
when the downlink control channel is received using the communications terminal before the contention resolution timer expires, check data on a downlink shared data channel indicated by information from the received downlink control channel; and
when the checked data includes a unique identifier for the communications terminal, terminate the random access procedure.

8. The method in claim 6, wherein the processing circuitry is configured to:
apply a back-off time if the communications terminal identifier is not received upon expiration of the contention resolution timer;
stop monitoring the downlink control channel; and
perform random access procedures again after the back-off time.

9. The method in claim 8, wherein the processing circuitry is configured to:

resume monitoring the downlink control channel after the back-off time expires.

10. The communications terminal in claim 6, wherein the temporary cell identifier is a Cell-Radio Network Temporary Identifier (C-RNTI).

11. The communications terminal in claim 6, wherein the start of the contention resolution timer is associated with random access contention resolution.

\* \* \* \* \*

UNITED STATES PATENT AND TRADEMARK OFFICE
CERTIFICATE OF CORRECTION

PATENT NO. : 9,807,688 B2
APPLICATION NO. : 15/231861
DATED : October 31, 2017
INVENTOR(S) : Yi et al.

It is certified that error appears in the above-identified patent and that said Letters Patent is hereby corrected as shown below:

In the Specification

Column 3, Line 63, change "Layer 2performs" to --Layer 2 performs--

Column 8, Line 44, delete "[0060]"

Column 8, Line 47, delete "[0061]"

Column 8, Line 48, delete "[0062]"

Column 8, Line 50, delete "[0063]"

Column 12, Line 60, change "running)." to --running),--

Column 12, Line 62, delete "[0107]"

Signed and Sealed this
Thirtieth Day of October, 2018

Andrei Iancu
*Director of the United States Patent and Trademark Office*